United States Patent
Imamura

(10) Patent No.: US 9,571,686 B2
(45) Date of Patent: Feb. 14, 2017

(54) ELECTRONIC DEVICE WITH ENERGY SAVING MODE AND ERROR STATE DETECTION

(71) Applicant: MURATA MACHINERY, LTD., Kyoto-shi, Kyoto (JP)

(72) Inventor: Yuichi Imamura, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 14/519,186

(22) Filed: Oct. 21, 2014

(65) Prior Publication Data

US 2015/0109632 A1    Apr. 23, 2015

(30) Foreign Application Priority Data

Oct. 22, 2013    (JP) .................................. 2013-219203

(51) Int. Cl.
*G06F 1/14* (2006.01)
*H04N 1/00* (2006.01)

(52) U.S. Cl.
CPC ...... *H04N 1/00904* (2013.01); *H04N 1/00896* (2013.01); *H04N 2201/0094* (2013.01)

(58) Field of Classification Search
None
See application file for complete search history.

(56) References Cited

U.S. PATENT DOCUMENTS

2007/0279678 A1* 12/2007 Kobayashi .................. 358/1.15
2012/0069370 A1* 3/2012 Eguchi ......................... 358/1.13

FOREIGN PATENT DOCUMENTS

| JP | 2001-255968 A | 9/2001 |
| JP | 2002-356038 A | 12/2002 |
| JP | 2003335025 | * 11/2003 |
| JP | 2004-333955 A | 11/2004 |
| JP | 2006-095739 A | 4/2006 |

(Continued)

OTHER PUBLICATIONS

Machine translation of JP Pub 2003335025 to Yoshizumi Soji.*
Yoshizumi Soji; "Imaging Apparatus"; JP Pub Date Nov. 25, 2003; JP Pub No. 2003-335025.*

*Primary Examiner* — Benny Q Tieu
*Assistant Examiner* — Haris Sabah
(74) *Attorney, Agent, or Firm* — Keating & Bennett, LLP

(57) ABSTRACT

An electronic device includes a first mode, a second mode, a mode transition accepting unit, a state confirmation unit, and a transition determination unit. The mode transition accepting unit is configured to accept from a plurality of demanding sources a transition demand to transition from the first mode to the second mode. The state confirmation unit is configured to confirm a device state of the electronic device. The transition determination unit is configured to determine whether or not a transition from the first mode to the second mode is possible based on a demanding source of the transition demand accepted by the mode transition accepting unit, and the device state confirmed by the state confirmation unit. When the device state is a predetermined device state, the transition determination unit makes a determination that the transition is possible for some of the plurality of demanding sources that issued the transition demand and not possible for others of the plurality of demanding sources that issued the transition demand.

10 Claims, 10 Drawing Sheets

(56) References Cited

FOREIGN PATENT DOCUMENTS

| | | | |
|---|---|---|---|
| JP | 2006-333413 | A | 12/2006 |
| JP | 2008-194962 | A | 8/2008 |
| JP | 2008-271118 | A | 11/2008 |
| JP | 2012-101388 | A | 5/2012 |
| JP | 2012-151545 | A | 8/2012 |

* cited by examiner

FIG. 6

DETERMINATION PATTERN 1

| | DEVICE STATE (ERROR STATE) | ENERGY SAVING KEY | SLEEP TIMER | TIME SPECIFYING |
|---|---|---|---|---|
| (A) | IN FAN OPERATION | ○ | ○ | ○ |
| (B) | IN JAM GENERATION | × | × | ○ |
| (C) | NO RECORDING PAPER IN ALL PAPER FEED CASSETTES | × | × | ○ |
| (D) | PAPER FEED CASSETTE/DEVICE COVER OPENED | × | × | ○ |
| (E) | REMAINING PAPER PRESENT | × | × | ○ |
| (F) | ADF DOCUMENT PRESENT | × | × | ○ |
| (G) | DEVICE LIFESPAN | × | × | ○ |
| (H) | NEAR EMPTY | × | × | ○ |
| (I) | IN SCAN/FAX/PRINTER OPERATION/IN PC PRINTING | × | × | × |
| (J) | IN LOGIN | × | × | × |
| (K) | IN FCOT PREPARATORY OPERATION | × | × | × |
| (L) | IN JOB OPERATION | × | × | × |
| (M) | IN DEVICE PREPARATION | × | × | × |
| (N) | ROM UPDATE PROCESS | × | × | × |
| (O) | RELATED TO SYSTEM ACTIVATION/STOP | × | × | × |
| (P) | STORAGE PROCESS | × | × | × |
| (Q) | INTERRUPTION PROCESS | × | × | × |
| (R) | IN DATA TRANSFER | × | × | × |
| (S) | SEVERE SYSTEM/DEVICE ERROR | × | × | × |
| | | ↑ | ↑ | ↑ |
| | | CONDITION 1 | CONDITION 2 | CONDITION 3 |

FIG. 7

DETERMINATION PATTERN 2

| | DEVICE STATE (ERROR STATE) | ENERGY SAVING KEY | SLEEP TIMER | TIME SPECIFYING |
|---|---|---|---|---|
| (A) | IN FAN OPERATION | ○ | ○ | ○ |
| (B) | IN JAM GENERATION | ○ | × | ○ |
| (C) | NO RECORDING PAPER IN ALL PAPER FEED CASSETTES | ○ | × | ○ |
| (D) | PAPER FEED CASSETTE/DEVICE COVER OPENED | ○ | × | ○ |
| (E) | REMAINING PAPER PRESENT | ○ | × | ○ |
| (F) | ADF DOCUMENT PRESENT | ○ | × | ○ |
| (G) | DEVICE LIFESPAN | ○ | × | ○ |
| (H) | NEAR EMPTY | ○ | × | ○ |
| (I) | IN SCAN/FAX/PRINTER OPERATION/IN PC PRINTING | × | × | × |
| (J) | IN LOGIN | × | × | × |
| (K) | IN FCOT PREPARATORY OPERATION | × | × | × |
| (L) | IN JOB OPERATION | × | × | × |
| (M) | IN DEVICE PREPARATION | × | × | × |
| (N) | ROM UPDATE PROCESS | × | × | × |
| (O) | RELATED TO SYSTEM ACTIVATION/STOP | × | × | × |
| (P) | STORAGE PROCESS | × | × | × |
| (Q) | INTERRUPTION PROCESS | × | × | × |
| (R) | IN DATA TRANSFER | × | × | × |
| (S) | SEVERE SYSTEM/DEVICE ERROR | × | × | × |
| | | ↑ CONDITION 1 | ↑ CONDITION 2 | ↑ CONDITION 3 |

FIG. 8

DETERMINATION PATTERN 3

| | DEVICE STATE (ERROR STATE) | ENERGY SAVING KEY | SLEEP TIMER | TIME SPECIFYING |
|---|---|---|---|---|
| (A) | IN FAN OPERATION | ○ | ○ | ○ |
| (B) | IN JAM GENERATION | × | ○ | ○ |
| (C) | NO RECORDING PAPER IN ALL PAPER FEED CASSETTES | × | ○ | ○ |
| (D) | PAPER FEED CASSETTE/DEVICE COVER OPENED | × | ○ | ○ |
| (E) | REMAINING PAPER PRESENT | × | ○ | ○ |
| (F) | ADF DOCUMENT PRESENT | × | ○ | ○ |
| (G) | DEVICE LIFESPAN | × | ○ | ○ |
| (H) | NEAR EMPTY | × | ○ | × |
| (I) | IN SCAN/FAX/PRINTER OPERATION/IN PC PRINTING | × | × | × |
| (J) | IN LOGIN | × | × | × |
| (K) | IN FCOT PREPARATORY OPERATION | × | × | × |
| (L) | IN JOB OPERATION | × | × | × |
| (M) | IN DEVICE PREPARATION | × | × | × |
| (N) | ROM UPDATE PROCESS | × | × | × |
| (O) | RELATED TO SYSTEM ACTIVATION/STOP | × | × | × |
| (P) | STORAGE PROCESS | × | × | × |
| (Q) | INTERRUPTION PROCESS | × | × | × |
| (R) | IN DATA TRANSFER | × | × | × |
| (S) | SEVERE SYSTEM/DEVICE ERROR | × | × | × |

← CONDITION 1  ← CONDITION 2  ← CONDITION 3

FIG. 10

DETERMINATION PATTERN 4

| | DEVICE STATE (ERROR STATE) | ENERGY SAVING KEY | SLEEP TIMER | TIME SPECIFYING |
|---|---|---|---|---|
| (A) | IN FAN OPERATION | ○ | ○ | ○ |
| (B) | IN JAM GENERATION | × | ○ | ○ |
| (C) | NO RECORDING PAPER IN ALL PAPER FEED CASSETTES | × | × | ○ |
| (D) | PAPER FEED CASSETTE/DEVICE COVER OPENED | × | × | ○ |
| (E) | REMAINING PAPER PRESENT | × | × | ○ |
| (F) | ADF DOCUMENT PRESENT | ○ | × | ○ |
| (G) | DEVICE LIFESPAN | ○ | × | ○ |
| (H) | NEAR EMPTY | × | × | ○ |
| (I) | IN SCAN/FAX/PRINTER OPERATION/IN PC PRINTING | × | × | × |
| (J) | IN LOGIN | × | × | × |
| (K) | IN FCOT PREPARATORY OPERATION | × | × | × |
| (L) | IN JOB OPERATION | × | × | × |
| (M) | IN DEVICE PREPARATION | × | × | × |
| (N) | ROM UPDATE PROCESS | × | × | × |
| (O) | RELATED TO SYSTEM ACTIVATION/STOP | × | × | × |
| (P) | STORAGE PROCESS | × | × | × |
| (Q) | INTERRUPTION PROCESS | × | × | × |
| (R) | IN DATA TRANSFER | × | × | × |
| (S) | SEVERE SYSTEM/DEVICE ERROR | × | × | × |

CONDITION 1  CONDITION 2  CONDITION 3

ELECTRONIC DEVICE WITH ENERGY SAVING MODE AND ERROR STATE DETECTION

CROSS-REFERENCE TO RELATED APPLICATIONS

This application claims priority under 35 U.S.C. 119 to Japanese Patent Application No. 2013-219203, filed on Oct. 22, 2013, which application is hereby incorporated by reference in its entirety.

BACKGROUND OF THE INVENTION

1. Field of the Invention

The present invention relates to electronic devices having an energy saving mode to save electric power consumption, and in particular, to a multi-function peripheral having a copy function, a printer function, a facsimile function, and the like.

2. Description of the Related Art

In an electronic device including an image forming unit such as a copying machine, a printer, a facsimile, and the like, an energy saving mode is set through a predetermined operation to suppress the electric power consumption.

Recently, a multifunction peripheral called an MFP (Multifunction Peripheral) having a copy function, a printer function, and a facsimile function is in widespread use. Similar to the copying machine, the printer, the facsimile, and the like, the MFP also generally has the energy saving mode for saving the electric power consumption.

In the energy saving mode of the MFP, a control unit, for example, carries out controls such as turning OFF a backlight of an operation display unit, setting a fixing unit to a preheat temperature, setting a scanner unit to an OFF state, and the like.

The control unit can transition to the energy saving mode based on a transition demand generated when a user operates a predetermined input key, for example.

If a stopped state of each unit of the device is continued beyond a predetermined time, the control unit can transition to the energy saving mode based on a transition demand generated by a timer that measures a duration time.

Furthermore, when a current time and a set predetermined date and time correspond, the control unit can transition to the energy saving mode based on a transition demand generated by a time specifying unit.

A demanding source that generates the transition demand to change to the energy saving mode conventionally includes an electronic device that uses the input key and the time specifying unit, or an electronic device that uses the input key and the timer.

The electronic device does not determine if the demanding source of the transition demand to the energy saving mode is the input key, the timer, or the time specifying unit. Therefore, when accepting the transition demand to the energy saving mode from any one of the input key, the timer, or the time specifying unit, the control unit sets each unit of the device to the energy saving mode.

Thus, if an error state such as paper jam of a paper transporting unit, paper out, toner empty, and the like is occurring when the transition demand to the energy saving mode is accepted, the printing may not be carried out at the time of facsimile reception if the control unit transitions to the energy saving mode without the error state resolved.

Thus, if a predetermined error state such as paper jam of the paper transportation unit, paper out, toner empty, and the like is occurring, the control unit does not transition to the energy saving mode and notifies the error state to the user even if the transition demand to the energy saving mode is made.

In this case, the control unit does not transition to the energy saving mode even if the user cannot resolve the error state that is occurring, and thus an effective electric power saving effect cannot be obtained. For example, when the time specifying unit generates the transition demand to the energy saving mode outside of working hours of an office, the error state remains unresolved if the office is unoccupied, and hence the transition to the energy saving mode cannot be made.

SUMMARY OF THE INVENTION

Preferred embodiments of the present invention provide an electronic device capable of effectively carrying out a transition to the energy saving mode when the electronic device accepts the transition demand to the energy saving mode in a predetermined error state.

An electronic device according to a preferred embodiment of the present invention includes a first mode, a second mode, a mode transition accepting unit, a state confirmation unit, and a transition determination unit. The first mode is configured to operate at a predetermined electric power, and a second mode is configured to operate at an electric power lower than the first mode. The mode transition accepting unit is configured to accept a transition demand to transition from the first mode to the second mode from a plurality of demanding sources. The state confirmation unit is configured to confirm a device state of the electronic device. The transition determination unit is configured to determine whether or not a transition from the first mode to the second mode is possible based on a demanding source of the transition demand accepted by the mode transition accepting unit, and the device state confirmed by the state confirmation unit, and when the device state is a predetermined device state, is configured to make a determination that the transition is possible for some of the plurality of demanding sources that issued the transition demand and not possible for others of the plurality of demanding sources that issued the transition demand.

According to the configuration described above, whether or not the transition to the second mode is possible is determined according to the demanding source that issued the transition demand to transition from the first mode to the second mode, and thus, an effective saving in electricity is carried out.

The electronic device may further include, as demanding sources of the transition demand, an input key configured to generate the transition demand by an operation of a user; and a timer configured to generate the transition demand when a predetermined state is continued for a predetermined time. When the device state is the predetermined device state, the transition determination unit determines that the transition from the first mode to the second mode is possible if the mode transition accepting unit accepts the transition demand from the input key as the demanding source, and determines that the transition from the first mode to the second mode is not possible if the mode transition accepting unit accepts the transition demand from the timer as the demanding source.

For instance, when accepting the transition demand from the input key as the demanding source, the transition determination unit assumes that the user recognized that the device state is the predetermined device state, and determines that the transition from the first mode to the second mode is possible. When accepting the transition demand from the timer as the demanding source, the transition determination unit assumes that the user is distant from the electronic device, and does not enable the transition from the first mode to the second mode to notify that the device state is the predetermined device state.

When the device state is the predetermined device state, the transition determination unit determines that the transition from the first mode to the second mode is not possible if the mode transition accepting unit accepts the transition demand from the input key as the demanding source, and determines that the transition from the first mode to the second mode is possible if the mode transition accepting unit accepts the transition demand from the timer as the demanding source.

For instance, when accepting the transition demand from the input key as the demanding source, the transition determination unit assumes that the user is able to resolve the predetermined device state, and determines that the transition from the first mode to the second mode is not possible. When accepting the transition demand from the timer as the demanding source, the transition determination unit assumes that the user is not able to resolve the predetermined device state, and permits the transition from the first mode to the second mode.

The electronic device may further include, as demanding sources of the transition demand, an input key configured to generate the transition demand by an operation of a user, a timer configured to generate the transition demand when a predetermined state is continued for a predetermined time, and a time specifying unit configured to generate the transition demand at a set predetermined time.

In this case, the transition determination unit determines whether or not the user can resolve the predetermined device state and determine whether the transition to the second mode is possible depending on from which demanding source the transition demand is sent.

When the device state is the predetermined device state, the transition determination unit determines that the transition from the first mode to the second mode is not possible if the mode transition accepting unit accepts the transition demand from the input key or the timer as the demanding source, and determines that the transition from the first mode to the second mode is possible if the mode transition accepting unit accepts the transition demand from the time specifying unit as the demanding source.

For instance, when accepting the transition demand from the input key or the timer as the demanding source, the transition determination unit assumes that the user is able to resolve the predetermined device state, and determines that the transition from the first mode to the second mode is not possible. When accepting the transition demand from the time specifying unit as the demanding source, the transition determination unit assumes that the user is not able to resolve the predetermined device state, and permits the transition from the first mode to the second mode.

When the device state is the predetermined device state, the transition determination unit determines that the transition from the first mode to the second mode is not possible if the mode transition accepting unit accepts the transition demand from the input key as the demanding source, and thereafter, determines that the transition from the first mode to the second mode is possible when the predetermined device state is resolved within a predetermined time.

In this case, when the demanding source of the transition demand is the input key, the transition determination unit assumes that the user who operated the input key is very close to the electronic device, and thus the transition from the first mode to the second mode is capable of being made when the predetermined device state is resolved by the user within the predetermined time, such that the user does not need to operate the input key again.

When the device state is the predetermined device state, the transition determination unit determines that the transition from the first mode to the second mode is not possible if the mode transition accepting unit accepts the transition demand from the timer as the demanding source, and determines that the transition from the first mode to the second mode is possible if the mode transition accepting unit accepts the transition demand from the input key or the time specifying unit as the demanding source.

In this case, when the demanding source of the transition demand is the input key, the transition determination unit assumes that the user who operated the input key confirmed the operation screen of the electronic device and recognized that the device state is the predetermined device state, and thus determines that the transition from the first mode to second mode is possible. When the demanding source of the transition demand is the timer, the transition determination unit determines that the user is at a position distant from the electronic device, and disables the transition from the first mode to the second mode for the purpose of notifying the user that the device state is the predetermined device state. Furthermore, when the demanding source of the transition demand is the time specifying unit, the transition determination unit assumes that the user is not able to resolve the predetermined device state, and permits the transition from the first mode to the second mode.

When the device state is the predetermined device state, the transition determination unit determines that the transition from the first mode to the second mode is not possible if the mode transition accepting unit accepts the transition demand from the input key as the demanding source, and determines that the transition from the first mode to the second mode is possible if the mode transition accepting unit accepts the transition demand from the timer or the time specifying unit as the demanding source.

In this case, if the input key is operated by the user but the predetermined device state is not resolved, the transition determination unit assumes that the user who operated the input key did not confirm the operation screen, and the like. Therefore, the transition determination unit disables the transition from the first mode to the second mode for the purpose of notifying the user that the electronic device is in the predetermined device state.

When the demanding source of the transition demand is the timer or the time specifying unit, the transition determination unit assumes that the user is not close to the electronic device and cannot immediately resolve the predetermined device state, and permits the transition from the first mode to the second mode.

The predetermined device state includes a first device state and a second device state, and the transition determination unit is able to determine, with respect to the transition demand from the same demanding source, that the transition from the first mode to the second mode is not possible for the first device state, and determines that the transition from the first mode to the second mode is possible for the second device state.

In this case, assuming an error in which paper jam is generated in a paper transporting unit from a paper feed unit to an output tray through the developing unit, an error such as paper out of the paper feed unit, that is, an error state that is able to be immediately resolved by the user as a first device state, and an error state, system update, and the like requiring the maintenance operation as the second device state, the transition determination unit determines whether the transition from the first mode to the second mode is possible.

A transmission/reception unit configured to transmit and receive data through a network may be further provided, wherein the mode transition accepting unit is configured to accept a transition demand received by the transmission/reception unit.

In this case, the transition determination unit is configured to accept the transition demand by the remote operation through the network and determine whether the transition from the first mode to the second mode is possible.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is an explanatory view illustrating one example of a determination pattern for whether the transition to the energy saving mode is possible.

FIG. 7 is an explanatory view illustrating another example of a determination pattern for whether the transition to the energy saving mode is possible.

FIG. 8 is an explanatory view illustrating another further example of a determination pattern for whether the transition to the energy saving mode is possible.

FIG. 10 is an explanatory view illustrating another example of the determination pattern for whether the transition to the energy saving mode is possible.

DETAILED DESCRIPTION OF THE PREFERRED EMBODIMENTS

Preferred embodiments of the present invention will be hereinafter described in detail with reference to the drawings. The preferred embodiments described below are preferred examples of the present invention and do not limit the present invention.

Figure 1:
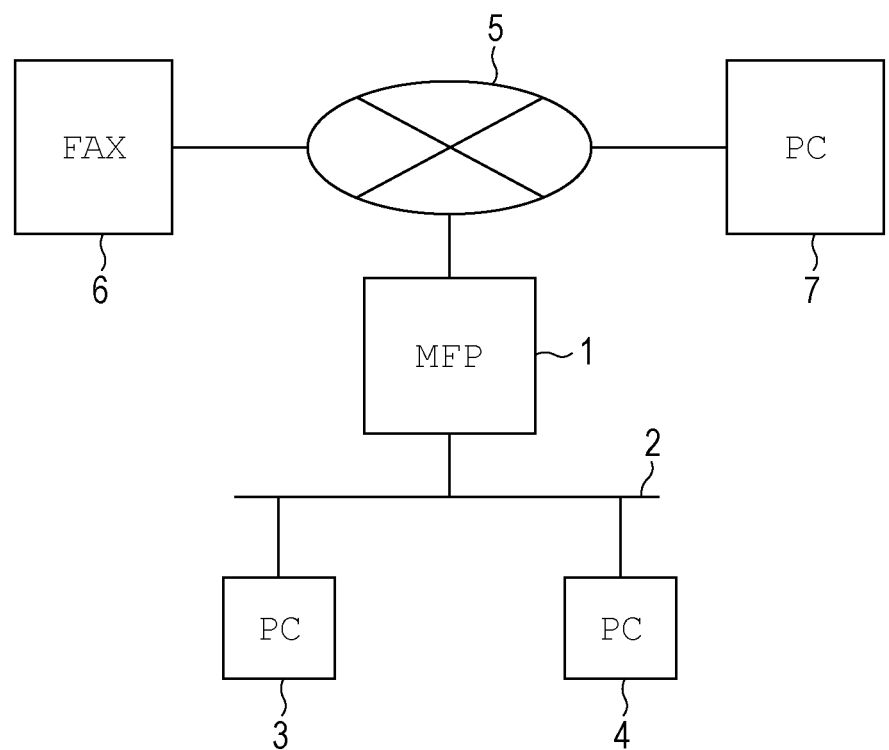
FIG. 1 is an explanatory view illustrating a schematic configuration of a communication system including an electronic device.

FIG. 1 is an explanatory view illustrating a schematic configuration of a communication system including an electronic device according to a preferred embodiment of the present invention.

An MFP (Multi Function Peripheral) 1 configured to perform a complex function such as a copy function, a printer function, a facsimile function, and the like will be described as one preferred embodiment of the electronic device of the present invention.

The MFP 1 is configured to transmit and receive data with other facsimile machines 6, computer terminals (PC: Personal Computer) 7, and the like through a network 5 such as the PSTN (Public Switched Telephone Network), Internet, and the like.

The MFP 1 is also connected to a LAN (Local Area Network) 2, and thus is connected to computer terminals (PC) 3, 4 through the LAN 2.

The computer terminals 3, 4 are connected to the MFP 1 through the LAN 2, and are configured to transmit various instructions to the MFP 1 by an operation of a user.

Figure 2:
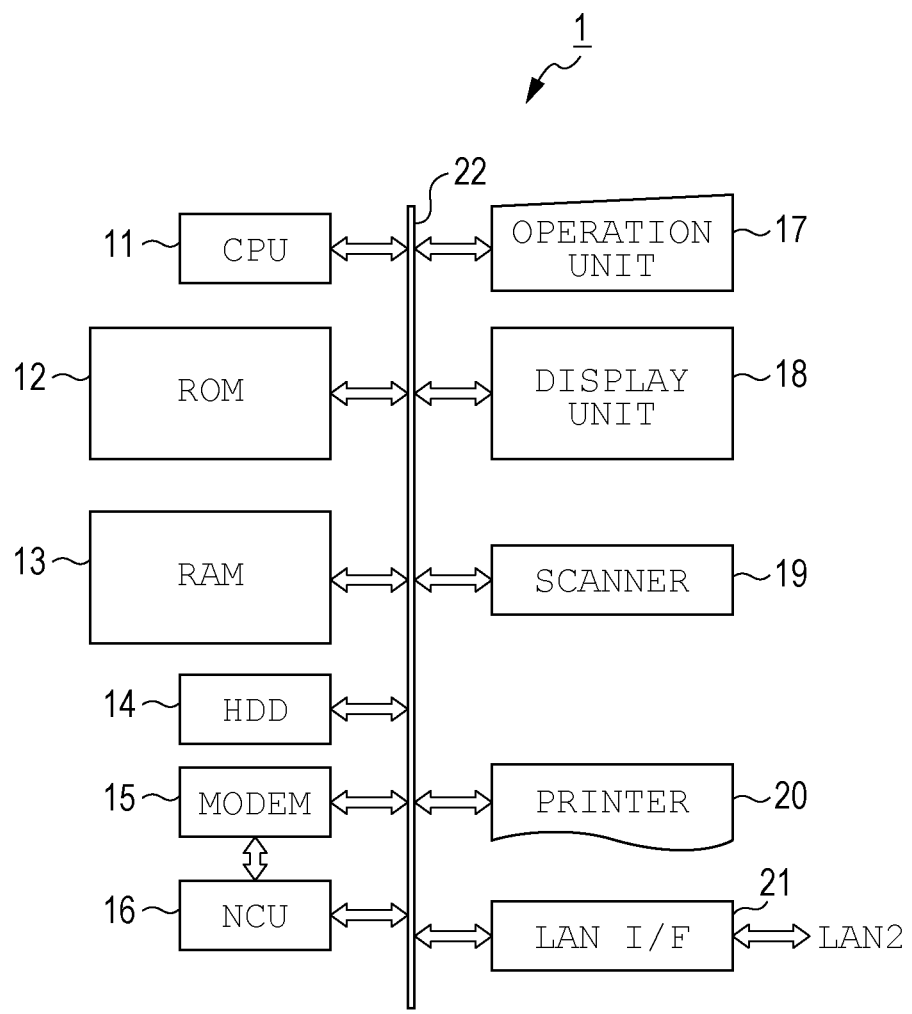
FIG. 2 is a block diagram illustrating a hardware configuration of an MFP.

FIG. 2 is a block diagram illustrating a hardware configuration of the MFP.

The MFP 1 preferably includes a CPU (Central Processing Unit) 11, a ROM (Read Only Memory) 12, a RAM (Random Access Memory) 13, an HDD (Hard Disk Drive) 14, a modem 15, an NCU (Network Control Unit) 16, an operation unit 17, a display unit 18, a scanner 19, a printer 20, and an LAN interface 21, which are connected to each other by a bus 22.

The CPU 11 executes a control program stored in the ROM 12 to control each unit of the MFP 1, and is a one-chip microcomputer incorporating a calendar function, a timer function, and the like.

The ROM 12 is a read only memory that stores control programs, various types of parameters, and the like.

The RAM 13 is a work area of when the CPU 11 executes the control program, and is a volatile memory that temporarily stores image data read by the scanner 19, image data transmitted from the facsimile machine 6, and the like.

The HDD 14 is a storage device that accumulates image data transmitted from the facsimile machine 6, image data received from the computer terminals 3, 4 to transmit to the facsimile machine 6, and the like.

The modem 15 is a facsimile modem that modulates the image data for facsimile transmission, or demodulates the image data transmitted from the facsimile machine 6.

The NCU 16 is a network termination device connected to the network 5.

The operation unit 17 is a user interface that accepts the operation of the user, and is configured, for example, by an instructing unit including a touch panel, a key switch, and the like.

The display unit 18 is an information display device configured to display the current operation state and the state of the device, and is configured, for example, by a liquid crystal display, and the like.

The scanner 19 is an image reading device that optically reads a document by a CCD, and converts the same to image data for facsimile transmission or for copy and output by the printer 20.

The printer 20 is a printing device, and for example, forms a toner image corresponding to the image data on a photosensitive drum, transfers the toner image onto a paper, and fixes the image by thermal fusion.

The LAN interface 21 is a communication adapter that connects the MFP 1 and the LAN 2.

Electric power is supplied from an electric power supply unit (not illustrated) to each unit of the MFP 1 based on the control unit of the CPU 11.

Figure 3:
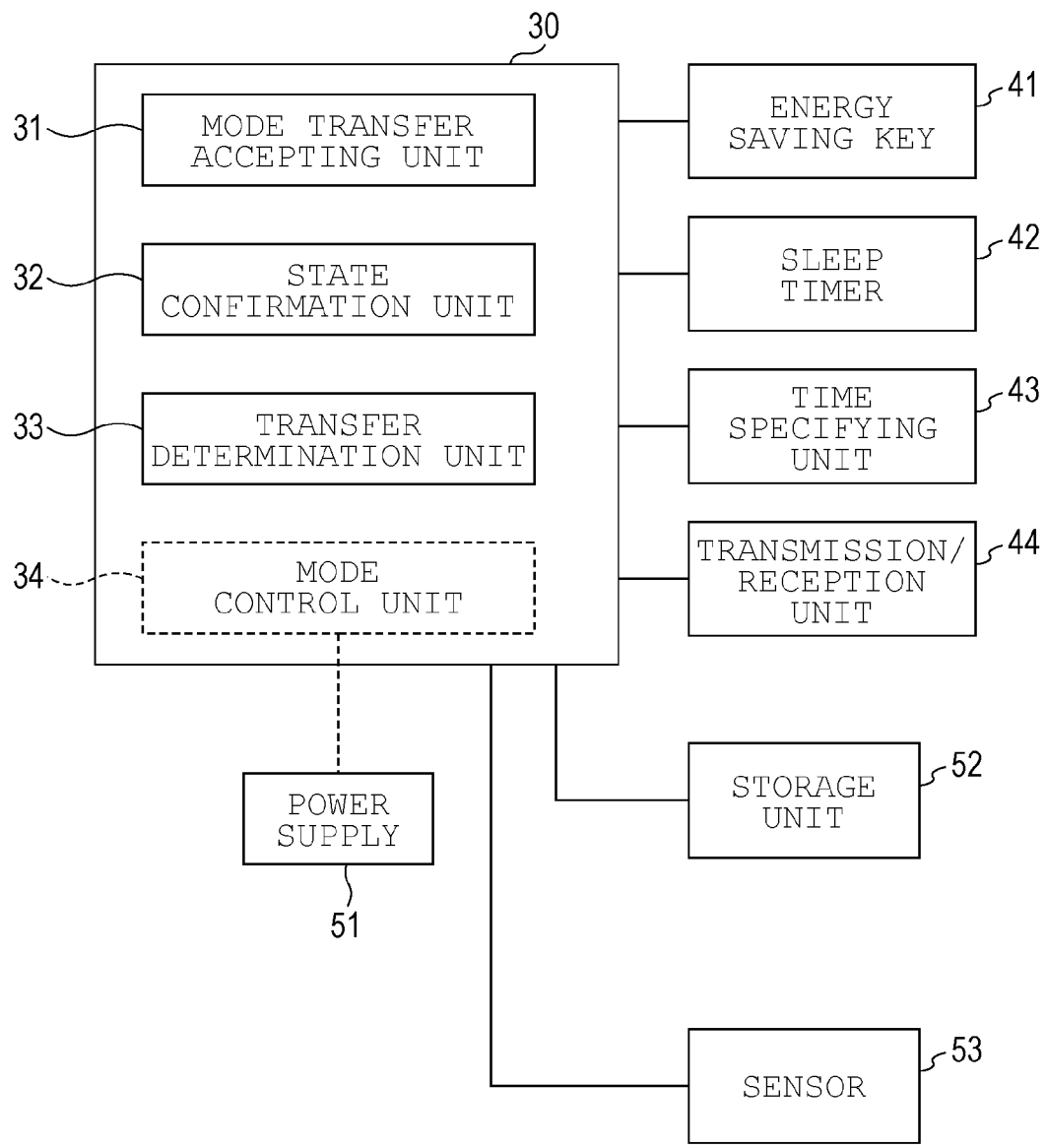
FIG. 3 is an explanatory view illustrating functions block realized when the CPU executes a control program.

FIG. 3 is an explanatory view illustrating functional units realized when the CPU executes the control program.

A control unit 30 is configured and/or programmed to realize functional units to control each unit when the CPU 11 executes the control program stored in the ROM 12. In FIG. 3, among the functional units realized by the control unit 30, a mode transition accepting unit 31, a state confirmation unit 32, a transition determination unit 33, and a mode control unit 34, which are functional units used for an energy saving mode transition determination, are illustrated.

An energy saving key 41, a sleep timer 42, a time specifying unit 43, and a transmission/reception unit 44 are connected to the control unit 30.

Furthermore, an electric power supply 51, a storage unit 52, and a sensor 53 are connected to the control unit 30.

The MFP 1 (one example of an electronic device) has a normal mode (one example of a first mode) of operating at a predetermined electric power and an energy saving mode (one example of a second mode) of operating at an electric power lower than the normal mode, where an operation mode is controlled by the control unit 30.

The mode transition accepting unit 31 (one example of a mode transition accepting unit) is configured to accept from a plurality of demanding sources a transition demand to transition from the normal mode to the energy saving mode.

The state confirmation unit 32 (one example of a state confirmation unit) confirms a device state of the electronic device.

The transition determination unit 33 (one example of a transition determination unit) determines whether or not a transition from the normal mode to the energy saving mode is possible based on the demanding source of the transition demand received by the mode transition accepting unit 31 and the device state confirmed by the state confirmation unit 32, and also makes a determination that the transition is possible for some of the plurality of demanding sources and not possible for others of the plurality of demanding sources when the device state is a predetermined device state.

The mode control unit 34 controls the supply electric power from the electric power supply 51 to each unit based on the determination result of the transition determination unit 33.

The energy saving key 41 (one example of input key) is a key switch arranged on a device main body of the MFP 1, and is a demanding source that transmits the transition demand to the mode transition accepting unit 31. The energy saving key 41 may, for example, be a portion of the operation unit 17 of FIG. 2, and transmits the transition demand to the energy saving mode to the control unit 30 by being pushed by the user.

The sleep timer 42 (one example of a timer) counts a time in which none of the copy function, the printer function, and the facsimile function of the MFP 1 is continuously operating on the basis of an internal clock of the control unit 30 or an external clock of a peripheral circuit.

For example, the sleep timer 42 starts counting when an operating condition is resolved, the operating condition including during an operation in which the operation unit 17 is operated, during a scanning operation by the scanner 19, during a facsimile operation, a state in which a document exists in an ADF (Auto Document Feeder (not illustrated)), during an operation of the printer 20, during an authentication terminal log-in, during data reception by the modem 15 or the LAN interface 21, and the like.

When a count value reaches a predetermined value, the sleep timer 42 transmits the transition demand from the normal mode to the energy saving mode to the mode transition accepting unit 31.

When the operation state of each unit described above occurs after the start of counting and before the count value reaches the predetermined value, the sleep timer 42 resets the count value to "0", and stops counting until the operating condition is resolved.

The time specifying unit 43 (one example of a time specifying unit) transmits the transition demand to transition from the normal mode to the energy saving mode to the mode transition accepting unit 31 when the current date and time is a set energy saving start time.

In the MFP 1, an energy saving start time and an energy saving cancel time can be set, and are stored in the storage unit 52, for example. The storage unit 52 corresponds to the RAM 13 of FIG. 2, and that which continues to hold the data even in the energy saving mode, for example, is used. For example, an FeRAM (Ferroelectric memory), a DDR SDRAM (Double Data Rate Synchronous Dynamic Random Access Memory), and the like can be used.

The MFP 1 can, for example, accept the setting of the energy saving start time and the energy saving cancel time through the operation unit 17, and stores the energy saving start time and the energy saving cancel time accepted by the operation of the user in the storage unit 52.

The control unit 30 includes a calendar clock configured or programmed to manage time and date, and control the current date and time.

Comparing the current date and time managed by the control unit 30 and the energy saving start time stored in the storage unit 52, the time specifying unit 43 transmits the transition demand to the mode transition accepting unit 31 when the current date and time reaches the energy saving start time.

The time specifying unit 43 may be a functional unit realized when the control unit 30 executes a predetermined program.

The transmission/reception unit 44 (one example of a transmission/reception unit) receives the transition demand to transition to the energy saving mode transmitted through the network, and receives the transition demand transmitted from the computer terminals 3, 4 through the LAN 2 or the transition demand transmitted from the computer terminal 7 through the network 5.

The electric power supply 51 supplies electric power to each unit of the MFP 1, and supplies the corresponding electric power of the normal operation mode or the energy saving mode based on the control of the control unit 30.

The sensor 53 detects state information in each unit of the MFP 1, and for example, includes an optical sensor configured or programmed to detect paper jam in a transportation path of the printer 20, an optical sensor configured or programmed to detect paper out in a paper feed unit (not illustrated), a temperature sensor configured or programmed to detect a temperature of the fixing unit (not illustrated), an optical sensor configured or programmed to detect toner empty or near empty in a toner cartridge (not illustrated), an optical sensor configured or programmed to detect presence or absence of a document of the scanner 19, and other sensors.

Figure 4:
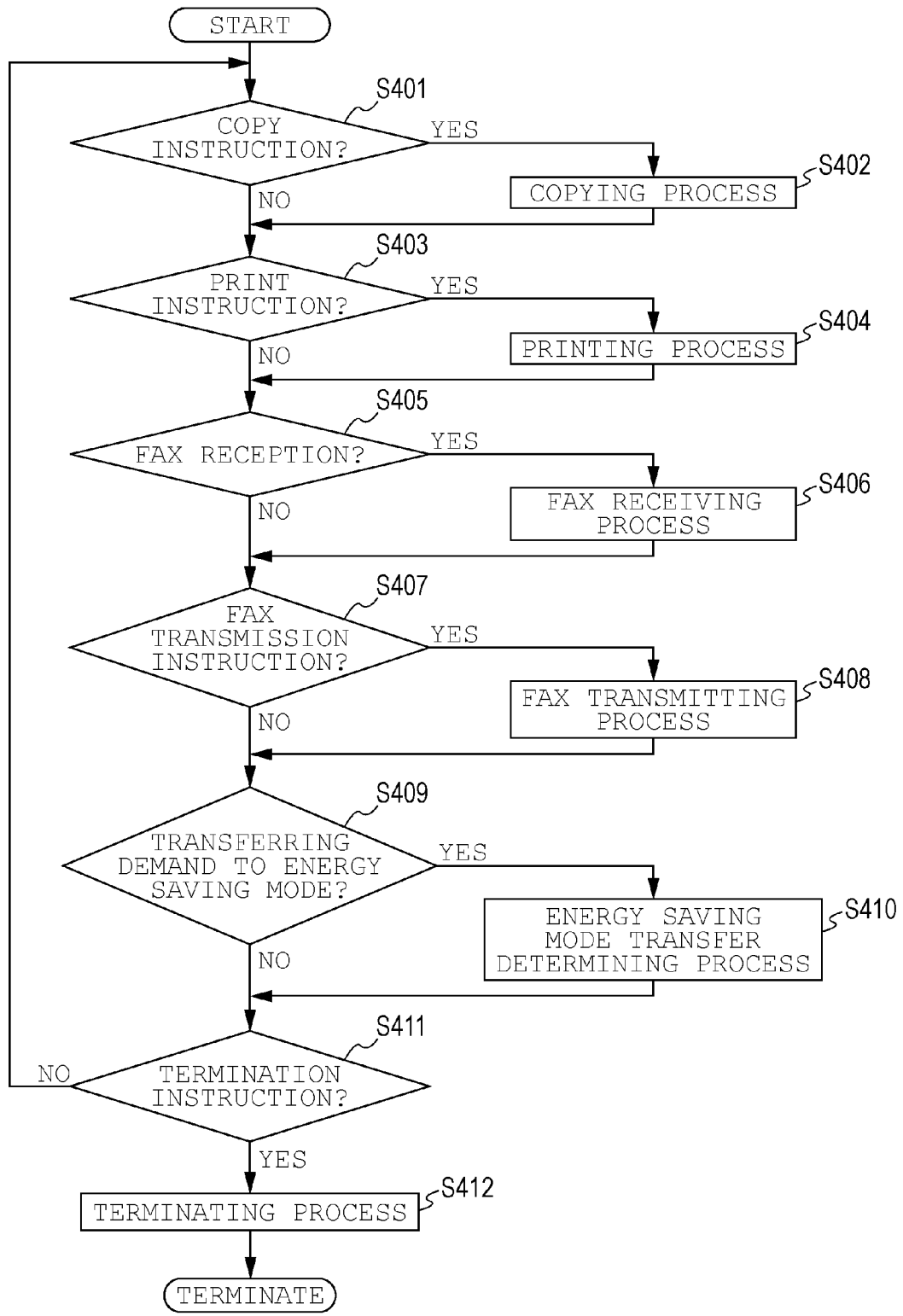
FIG. 4 is a flowchart related to a basic operation of the electronic device.

FIG. 4 is a flowchart related to a basic operation of the electronic device.

In step S401, the control unit 30 determines whether or not a copy instruction is issued. The control unit 30 proceeds to step S402 when determining that the operation unit 17 is operated and the copy instruction is issued, and otherwise proceeds to step S403.

In step S402, the control unit 30 executes a copying process based on the copy instruction input from the operation unit 17. For example, the control unit 30 executes, according to instructed number of documents and number of copies, the copying operation of reading a document image placed on a platen (not illustrated) or an ADF (not illustrated) with the scanner 19, forming a toner image on the photosensitive drum (not illustrated) of the printer 20, transferring the toner image onto a paper transported from a paper feed unit (not illustrated) to the photosensitive drum, and fixing the toner image transferred onto the paper with the fixing unit (not illustrated).

In step S403, the control unit 30 determines whether or not a print instruction is issued. The control unit 30 proceeds to step S404 when determining that the print instruction is issued, and otherwise proceeds to step S405.

In step S404, the control unit 30 executes a printing process based on the received print instruction. For example, when receiving the print instruction from the computer terminals 3, 4 through the LAN interface 21, the control unit 30 executes, according to an instructed number of prints, the printing operation of forming a toner image on the photosensitive drum of the printer 20 based on transmitted text data and/or image data, transferring the toner image onto a paper transported from the paper feed unit to the photosensitive drum, and fixing the toner image with the fixing unit.

In step S405, the control unit 30 determines whether or not data by facsimile is received. The control unit 30 proceeds to step S406 when determining that the data is received by facsimile, and otherwise proceeds to step S407.

In step S406, the control unit 30 executes a facsimile receiving process. For example, in response to a reception request transmitted from the facsimile machine 6 through the network 5, the control unit 30 receives data through the modem 15, and prints the received data on a paper with the printer 20 or stores the received data in the RAM 13.

In step S407, the control unit 30 determines whether or not an instruction for facsimile transmission is issued. The control unit 30 proceeds to step S408 when determining that the instruction for facsimile transmission is issued, and otherwise proceeds to step S409.

In step S408, the control unit 30 executes a facsimile transmitting process based on the instruction. For example, the control unit 30 reads the document placed on the platen or the ADF with the scanner 19, converts the read document to digital data and transmits the digital data to a specified transmitting destination through the modem 15 and the network 5. The control unit 30 is also preferably configured or programmed to execute the facsimile transmitting process based on the instruction for facsimile transmission transmitted from the computer terminals 3, 4 through the LAN interface 21.

In step S409, the control unit 30 determines whether or not a transition demand to the energy saving mode is accepted. The control unit 30 proceeds to step S410 when determining that the transition demand from the normal mode to the energy saving mode is accepted, and otherwise proceeds to step S411.

The transition demand to transition from the normal mode to the energy saving mode includes (a) a transition demand generated by the energy saving key 41 when the user pushes the energy saving key 41, (b) a transition demand generated by the sleep timer 42 when the count value of the sleep timer 42 reaches a predetermined value, (c) a transition demand generated by the time specifying unit 43 when the current time reaches an energy saving transition start time, (d) a transition demand received by the transmission/reception unit 44 through the LAN interface 21 or the network 5, and the like.

The control unit 30 proceeds to step S410 when accepting any one of such transition demands by the mode transition accepting unit 31.

In step S410, the control unit 30 executes an energy saving mode transition determining process. For example, the control unit 30 determines whether the transition to the energy saving mode is possible based on the demanding source that transmitted the transition demand from the normal mode to the energy saving mode, and the current device state, and carries out a control for mode transition based on the determination result.

In step S411, the control unit 30 determines whether or not a termination instruction is issued. The control unit 30 determines that the termination instruction is issued and proceeds to step S412 when a terminate key (not illustrated) of the operation unit 17 is operated, and otherwise proceeds to step S401.

In step S412, the control unit 30 executes a terminating process of storing history information and various parameters during the operation in the HDD 14 and turning OFF the electric power of each unit.

The control unit 30 may also be configured or programmed to execute the terminating process based on the termination instruction transmitted from the computer terminals 3, 4, 7 through the LAN interface 21 or the network 5.

Figure 5:
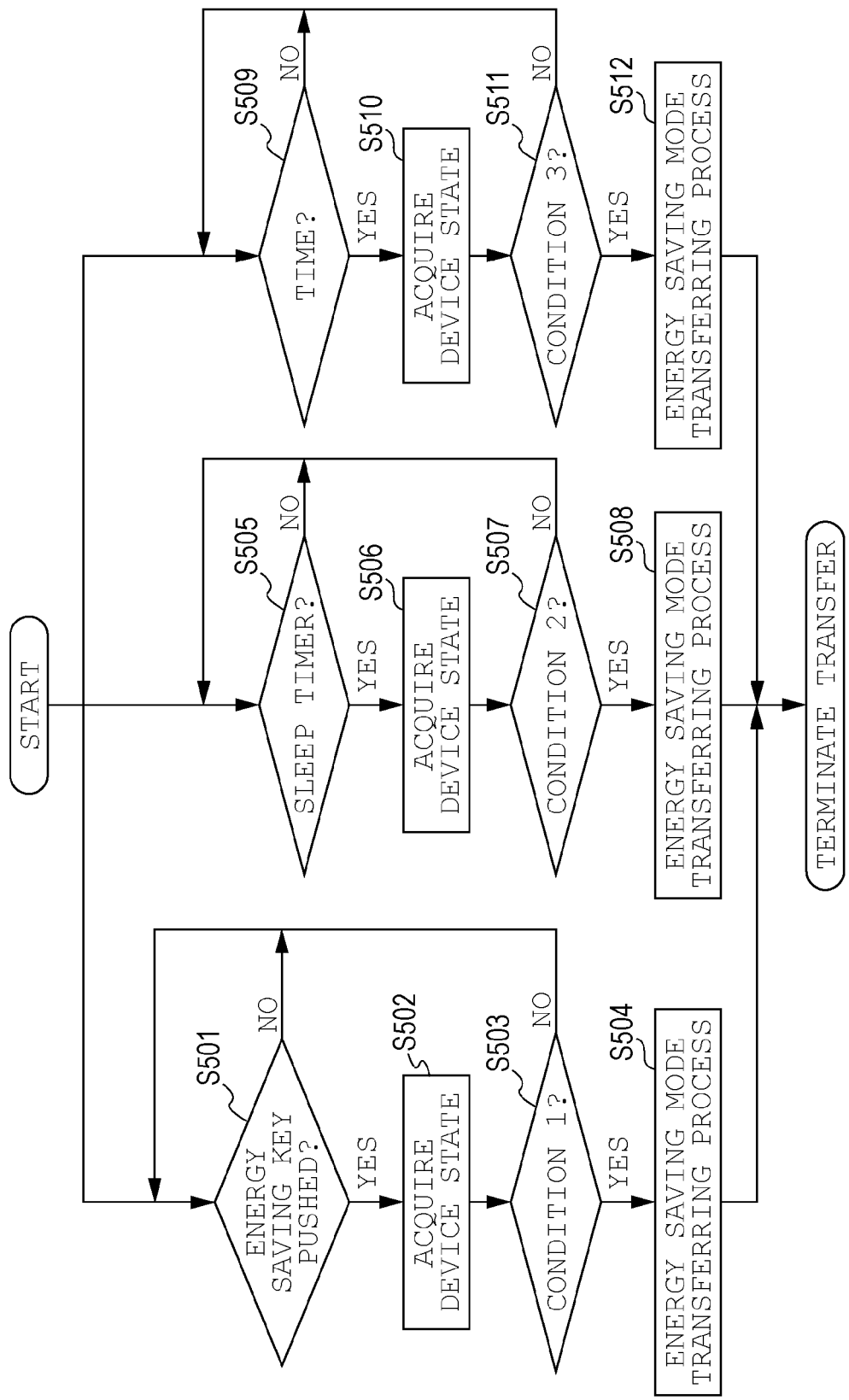
FIG. 5 is a flowchart of an energy saving mode transition determining process.

FIG. 5 is a flowchart of an energy saving mode transition determining process.

In the flowchart illustrated in FIG. 5, a case in which the control unit 30 determines whether the transition to the energy saving mode is possible based on the transition demands from the energy saving key 41, the sleep timer 42, and the time specifying unit 43 as the demanding sources will be described.

In step S501, the control unit 30 determines whether or not the energy saving key 41 is pushed. The control unit 30 waits at step S501 until the mode transition accepting unit 31 accepts the transition demand from the energy saving key 41. When the mode transition accepting unit 31 accepts the transition demand from the energy saving key 41, the control unit 30 determines that the user pushed the energy saving key 41 with an intention to transition to the energy saving mode, and proceeds to step S502.

In step S502, the control unit 30 causes the state confirmation unit 32 to confirm the current device state.

The state confirmation unit 32 detects the current device state based on the state information of each unit transmitted from the sensor 53.

In step S503, the control unit 30 determines whether or not condition 1 for the transition determination unit 33 to determine whether the transition from the normal mode to the energy saving mode is possible is satisfied. The condition 1 is set with whether or not the transition is possible for each current device state when the demanding source of the transition demand from the normal mode to the energy saving mode is the energy saving key 41.

The control unit 30 proceeds to step S504 when the transition determination unit 33 determines that the transition to the energy saving mode is possible based on the condition 1. The control unit 30 proceeds to step S501 when the transition determination unit 33 determines that the transition to the energy saving mode is not possible based on the condition 1.

In step S504, the control unit 30 causes the mode control unit 34 to carry out an energy saving mode transition process. The mode control unit 34 changes the electric power supplied from the electric power supply 51 to each unit so as to be in an operation state by the energy saving mode.

In step S505, the control unit 30 determines whether or not the transition demand is accepted from the sleep timer 42. The control unit 30 waits at step S505 until the mode transition accepting unit 31 accepts the transition demand from the sleep timer 42. When the mode transition accepting unit 31 accepts the transition demand from the sleep timer 42, the control unit 30 determines that a time during which each unit of the MFP 1 is not in the operating condition reached a predetermined value and proceeds to step S506.

In step S506, the control unit 30 causes the state confirmation unit 32 to confirm the current device state.

The state confirmation unit 32 detects the current device state based on the state information of each unit transmitted from the sensor 53.

In step S507, the control unit 30 determines whether or not condition 2 for the transition determination unit 33 to determine whether the transition from the normal mode to the energy saving mode is possible is satisfied. The condition 2 is set with whether or not the transition is possible for each current device state when the demanding source of the transition demand from the normal mode to the energy saving mode is the sleep timer 42.

The control unit 30 proceeds to step S508 when the transition determination unit 33 determines that the transition to the energy saving mode is possible based on the condition 2. The control unit 30 proceeds to step S505 when the transition determination unit 33 determines that the transition to the energy saving mode is not possible based on the condition 2.

In step S508, the control unit 30 causes the mode control unit 34 to carry out the energy saving mode transition process. The mode control unit 34 changes the electric power supplied from the electric power supply 51 to each unit so as to be in an operation state by the energy saving mode.

In step S509, the control unit 30 determines whether or not the transition demand is accepted from the time specifying unit 43. The control unit 30 waits at step S509 until the mode transition accepting unit 31 accepts the transition demand from the time specifying unit 43. When the mode transition accepting unit 31 accepts the transition demand from the time specifying unit 43, the control unit 30 determines that the current time reached the energy saving transition start time and proceeds to step S510.

In step S510, the control unit 30 causes the state confirmation unit 32 to confirm the current device state.

The state confirmation unit 32 detects the current device state based on the state information of each unit transmitted from the sensor 53.

In step S511, the control unit 30 determines whether or not condition 3 for the transition determination unit 33 to determine whether the transition from the normal mode to the energy saving mode is possible is satisfied. The condition 3 is set with whether or not the transition is possible for each current device state when the demanding source of the transition demand from the normal mode to the energy saving mode is the time specifying unit 43.

The control unit 30 proceeds to step S512 when the transition determination unit 33 determines that the transition to the energy saving mode is possible based on the condition 3. The control unit 30 proceeds to step S509 when the transition determination unit 33 determines that the transition to the energy saving mode is not possible based on the condition 3.

In step S512, the control unit 30 causes the mode control unit 34 to carry out the energy saving mode transition process. The mode control unit 34 changes the electric power supplied from the electric power supply 51 to each unit so as to be in an operation state by the energy saving mode.

FIG. 6 is an explanatory view illustrating one example of a determination pattern for whether the transition to the energy saving mode is possible.

When accepting the transition demand from the normal mode to the energy saving mode, the control unit 30 determines whether the transition to the energy saving mode is possible based on the demanding source and the current device state.

For example, whether the transition to the energy saving mode is possible, set to each device state for when the energy saving key 41 is the demanding source of the transition demand, is assumed as the condition 1. Similarly, whether the transition is possible for when the sleep timer 42 is the demanding source of the transition demand is assumed as the condition 2, and whether the transition is possible for when the time specifying unit 43 is the demanding source of the transition demand is assumed as the condition 3.

Examples of a device state that the state confirmation unit 32 is configured specify based on the state information transmitted from the sensor 53 are described below.

(A) In FAN Operation

After the image forming process by the printer 20 is terminated, the MFP 1 operates a fan (not illustrated) for a few minutes to cool each unit of the printer 20. The state confirmation unit 32 is configured determine whether or not the device state is in FAN operation based on a current flowing to a fan motor (not illustrated).

(B) In JAM Generation

A plurality of paper detection sensors (not illustrated) configured or programmed to detect a passing paper is disposed on a paper transportation path, which extends from a paper feed unit including a paper feed cassette and a paper feed tray to a paper discharge unit through a developing unit. The state confirmation unit 32 is configured to determine whether or not the device state is in JAM generation in the paper transportation path based on signals from the paper detection sensors.

(C) No Recording Paper in all Paper Feed Cassettes

The MFP 1 includes a plurality of paper feed cassettes (not illustrated) that store papers to be fed to the developing unit by size. The plurality of paper feed cassettes includes the paper detection sensor (not illustrated) preferably including an optical sensor. The state confirmation unit 32 is configured to determine whether or not the device state is a state in which there are no recording paper in all of the paper feed cassettes based on the signals from the paper detection sensors.

(D) Paper Feed Cassette/Device Cover Opened

The MFP 1 includes a cassette attachment position (not illustrated) configured to attach the plurality of paper feed cassettes, where an optical sensor (not illustrated) configured or programmed to detect whether or not the paper feed cassette is attached is arranged at each cassette attachment position.

The MFP 1 includes a plurality of device covers configured to open up the interior at the time of maintenance process and component replacement, where an optical sensor (not illustrated) configured or programmed to detect the open/close state of each device cover is provided.

The state confirmation unit 32 is configured or programmed to determine whether or not the device state is the paper feed cassette/device cover opened state based on the signals from the optical sensors.

(E) Remaining Paper Present

When paper jam is generated in the paper transportation path, which extends from the paper feed unit to the paper discharge unit through the developing unit, even if the paper causing the paper jam is removed, the subsequent paper may remain as a remaining paper. In this case as well, the state confirmation unit 32 is configured or programmed to determine whether or not the device state is a state in which the remaining paper is present based on the signals from the paper detection sensors on the paper transportation path.

(F) ADF Document Present

If an auto document feeder (ADF; not illustrated) that continuously supplies a plurality of documents to the platen of the scanner 19 is provided, an optical sensor (not illustrated) configured or programmed to detect whether or not the document exists is arranged in the ADF. The state confirmation unit 32 determines whether or not the device state is a state in which the ADF document is present based on the signal from the optical sensor arranged in the ADF.

(G) Device Lifespan

As the devices configuring the MFP 1 degrade with use, some devices need to be replaced when a predetermined condition is met. For example, the photosensitive drum, the developing unit, the fixing unit, and the transition roller arranged in the printer 20 are preferably replaced when a predetermined number of operations or an operation time is reached. Thus, the control unit 30 counts the number of operations or the operation time of the photosensitive drum, the developing unit, the fixing unit, and the transition roller and stores the same in the storage unit 52, and determines a device that reached a lifespan set for each device as a device lifespan. When the device is replaced, the control unit 30 resets the count value of the number of operations or the operation time to "0".

The state confirmation unit 32 determines whether or not the device state is the device lifespan based on the determination result of the control unit 30.

(H) Near Empty

The toner cartridge includes a toner sensor configured or programmed to detect a remaining toner, and transmits a signal notifying replacement timing to the control unit 30 as "near empty" when the remaining toner becomes smaller than a predetermined value. The state confirmation unit 32 determines whether or not the device state is the near empty based on the signal from the toner sensor of the toner cartridge.

(I) In Scan/FAX/Printer Operation/In PC Printing

The state confirmation unit 32 receives signals indicating that each unit is in the operating condition such as the operation of the scanner 19, the reception of the facsimile data by the modem 15, the image forming operation of the printer 20, the reception of PC print instruction from the computer terminals 3, 4, and the like, and determines whether or not the device state is in scan/FAX/printer operation/in PC printing.

(J) In Login

If the user is logged in to access the MFP 1 through the computer terminal 3, 4 connected by the LAN interface 21, the state confirmation unit 32 determines that the device state is in login.

(K) In FCOT Preparatory Operation

During the preparatory operation from when the document is set in the scanner 19 and the copy instruction key of the operation unit 17 is operated until the copying operation is started, the control unit 30 generates a signal indicating in FCOT (First Copy Output Time) preparatory operation. The state confirmation unit 32 determines whether or not the device state is in the FCOT preparatory operation based on the signal.

(L) In JOB Operation

If the copy instruction instructed by the operation unit 17, the print instruction instructed from the computer terminals 3, 4 through the LAN interface 21, and other JOBs in standby exist, the state confirmation unit 32 determines that the device state is in JOB operation.

(M) In Device Preparation

In states such as during server initialization, occurrence of device switching, during individual authentication device processing, during finisher initialization/operation, during movement of staple unit, during adjustment of toner concentration, during stopping of print, during USB connection initialization, and the like, the control unit 30 generates a signal indicating device preparation. The state confirmation unit 32 determines that the device state is device preparation based on the signal.

(N) ROM Updating

The control unit 30 updates the control programs, various parameters, and the like stored in the ROM 12 in response to an update request from a server (not illustrated) through the network 5. The state confirmation unit 32 determines whether or not the device state is ROM updating based on the signal of the control unit 30.

(O) Related to System Activation/Stop

If the MFP 1 is in states such as shutdown, electric power supply disconnection standby state, and reactivation start, the control unit 30 generates a signal indicating the same. The state confirmation unit 32 determines that the device state is system activated/stopped based on the signal.

(P) Storage Process

In states such as during storage replacement and confirmation, during storage complete erasure, during storage reconstruction, during storage import, completion of storage import, during storage export, and completion of storage export, the control unit 30 generates a signal indicating each of the above. The state confirmation unit 32 determines that the device state is during storage process based on the signal.

(Q) Interruption Process

When an interruption job is generated during the device operation, the control unit 30 generates a signal indicating each state of during transition to interruption, during interruption mode, and during cancellation of interruption in the respective states. The state confirmation unit 32 determines that the device state is during the interruption process based on the signal.

(R) In Data Transition

During the reception of the PC print data, during the processing at the time of exceeding the PC print memory, during the iFAX (INTERNET FAX) transmission, during the reception of the direct SMTP (Simple Mail Transfer Protocol), and during other data transmission/reception, the control unit 30 generates a signal indicating data transition. The state confirmation unit 32 determines that the device state is data transition based on the signal.

(S) Severe System/Device Error

When failure of software, an error related to storage data, a non-compatible error of the device, and the like occur, the control unit 30 generates a signal indicating that a severe system error occurred.

When non-connection of authentication terminal, setting failure of the device, overheat error, and the like occur, the control unit 30 generates a signal indicating that a severe device error occurred.

The state confirmation unit 32 determines that the device state is a severe system/device error based on the signals.

In the determination pattern 1 illustrated in FIG. 6, the transition to the energy saving mode is possible in the device state (A) for all of the conditions 1 to 3.

The device states (I) to (S) are in the operation of the device or in the execution of a process that cannot fail, and the transition to the energy saving mode is not possible for all of the conditions 1 to 3.

The device states (B) to (H) are error states in which the return can be made by the user operation. Therefore, when the energy saving key 41 is pushed, although the user who operated the energy saving key 41 is at a position of being able to resolve the error state of the device states (B) to (H), an assumption is made that the user has not confirmed the error state. Thus, according to the determination pattern 1, in the condition 1 having the energy saving key 41 as the demanding source of the transition demand, the transition to the energy saving mode is not possible to notify the user who operated the energy saving key 41 that the device state is any one of (B) to (H) if the device state is the device state (B) to (H).

If the transition demand from the sleep timer 42 as the demanding source is made, the user is assumed to be located at a position distant from the MFP 1. Therefore, according to the condition 2 of the determination pattern 1, the transition to the energy saving mode is set to be not possible to notify the user that the device state is any one of (B) to (H) if the device state is the device state (B) to (H).

The energy saving start time to the energy saving cancel time stored in the storage unit 52 are, for example, set to a time slot in which the user cannot immediately resolve the error state such as a late evening time slot in offices, weekends, and the like. Therefore, when the transition demand from the time specifying unit 43 as the demanding source is made, the normal mode is continued for a long time if the user is not able to immediately resolve the device states (B) to (H) and if the mode does not transition to the energy saving mode. In such a case, the energy saving effect is enhanced by transition to the energy saving mode even in the device states (B) to (H).

Therefore, according to the condition 3 of the determination pattern 1, the transition to the energy saving mode is set to be possible even for the device states (B) to (H).

FIG. 7 is an explanatory view illustrating another example of the determination pattern for determining whether the transition to the energy saving mode is possible.

In the determination pattern 2 illustrated in FIG. 7, the transition to the energy saving mode is possible in the device state (A) for all of the conditions 1 to 3.

The device states (I) to (S) are in the operation of the device or in the execution of a process that cannot fail, and the transition to the energy saving mode is not possible for all of the conditions 1 to 3.

In the determination pattern 2, under the condition 1 of having the energy saving key 41 as the demanding source of the transition demand, an assumption is made that the user who operated the energy saving key 41 has confirmed that the device state is any one of (B) to (H), and the transition to the energy saving mode is set to be possible for the device states (B) to (H).

If the transition demand from the sleep timer 42 as the demanding source is made, the user is assumed to be positioned at a position distant from the MFP 1. Therefore, according to the condition 2 of the determination pattern 2, the transition to the energy saving mode is set to be not possible to notify the user that the device state is any one of (B) to (H) if the device state is the device state (B) to (H).

In the condition 3 of the determination pattern 2, the transition to the energy saving mode is set to be possible even for the device states (B) to (H) for reasons similar to the determination pattern 1.

FIG. 8 is an explanatory view illustrating another further example of the determination pattern for determining whether the transition to the energy saving mode is possible.

In the determination pattern 3 illustrated in FIG. 8, the transition to the energy saving mode is possible in the device state (A) for all of the conditions 1 to 3.

The device states (I) to (S) are in the operation of the device or in the execution of a process that cannot fail, and the transition to the energy saving mode is not possible for all of the conditions 1 to 3.

In the determination pattern 3, under the condition 1 having the energy saving key 41 as the demanding source of the transition demand, the transition to the energy saving mode is set to be not possible to notify the user who operated the energy saving key 41 that the device state is any one of (B) to (H) if the device state is the device state (B) to (H).

If the transition demand from the sleep timer 42 as the demanding source is made, the user is assumed to be positioned at a position distant from the MFP 1. Therefore, according to the condition 2 of the determination pattern 3, the transition to the energy saving mode is set to be possible assuming the user is at a position of not being able to resolve the device states (B) to (H) if the device state is the device state (B) to (H).

In the condition 3 of the determination pattern 3, the transition to the energy saving mode is set to be possible even for the device states (B) to (H) for reasons similar to the determination pattern 1.

Figure 9:
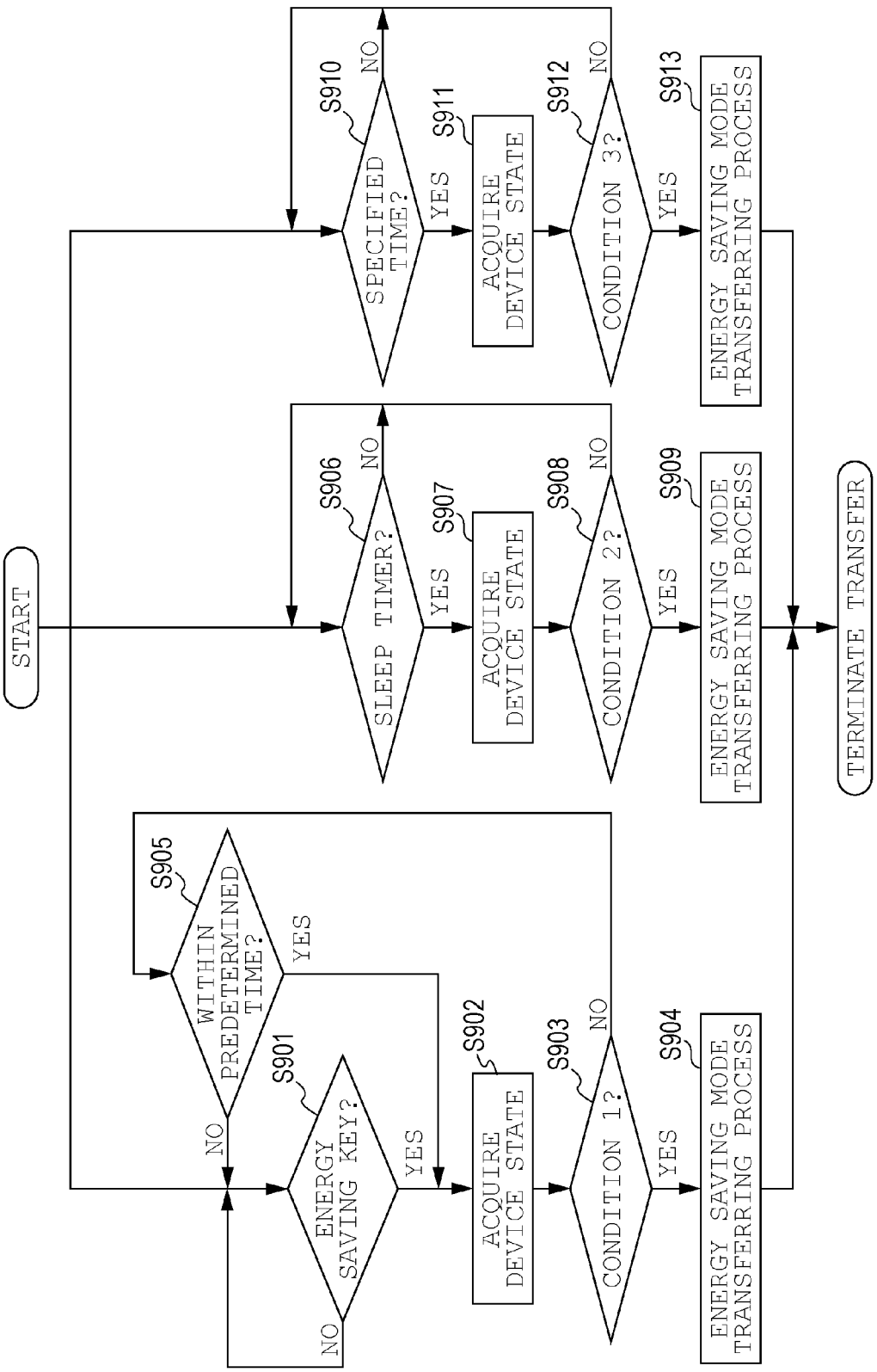
FIG. 9 is a flowchart illustrating another example of the energy saving mode transition determining process.

FIG. 9 is a flowchart illustrating another example of the energy saving mode transition determining process.

In the flowchart illustrated in FIG. 9 as well, a case in which the control unit 30 determines whether the transition to the energy saving mode is possible based on the transition demands from the energy saving key 41, the sleep timer 42, and the time specifying unit 43 as the demanding sources will be described.

In step S901, the control unit 30 determines whether or not the energy saving key 41 is pushed. The control unit 30 waits at step S901 until the mode transition accepting unit 31 accepts the transition demand from the energy saving key 41. When the mode transition accepting unit 31 accepts the transition demand from the energy saving key 41, the control unit 30 proceeds to step S902.

In step S902, the control unit 30 causes the state confirmation unit 32 to confirm the current device state.

In step S903, the control unit 30 determines whether or not the condition 1 for the transition determination unit 33 to determine whether the transition from the normal mode to the energy saving mode is possible is satisfied. Either one of the determination pattern 1 or 3 described above is capable of being used for the condition 1.

The control unit 30 proceeds to step S904 when the transition determination unit 33 determines that the transition to the energy saving mode is possible based on the condition 1. The control unit 30 proceeds to step S905 when the transition determination unit 33 determines that the transition to the energy saving mode is not possible based on the condition 1.

In step S904, the control unit 30 causes the mode control unit 34 to carry out the energy saving mode transition process. The mode control unit 34 changes the electric power supplied from the electric power supply 51 to each unit so as to be in an operation state by the energy saving mode.

In step S905, the control unit 30 determines whether or not a time from when the energy saving key 41 is operated is within a predetermined time. The control unit 30 proceeds to step S902 when determining that the time from when the energy saving key 41 is operated is within the predetermined time. The control unit 30 proceeds to step S901 when determining that the time from when the energy saving key 41 is operated exceeds the predetermined time.

Step S906 to step S913 execute operations similar to steps S505 to S512 of FIG. 5, and thus the detailed description will be omitted herein.

In the determination pattern 1 illustrated in FIG. 6 and the determination pattern 3 illustrated in FIG. 8, when the transition demand from the energy saving key 41 as the demanding source is made, the transition to the energy saving mode is set to be not possible if the device state is the device states (B) to (H).

Therefore, in step S903 of FIG. 9, the control unit 30 determines that the transition is not possible when the device state is the device states (B) to (H), and proceeds to step S905.

When the user operates the energy saving key 41, that user can be assumed to be very close to the MFP 1. Therefore, the user is assumed to be capable of confirming that the MFP 1 is in the device states (B) to (H), and capable of resolving the device states (B) to (H).

Therefore, the control unit 30 executes the loop of the steps S905, S902, and S903 for a predetermined time (e.g., one minute to a few minutes) from when the energy saving key 41 is operated to wait for the device states (B) to (H) to be resolved.

If the device states (B) to (H) are resolved within the predetermined time from when the energy saving key 41 is operated, the control unit 30 executes the energy saving mode transition process in step S904 without waiting for the energy saving key 41 to be newly operated.

If the device states (B) to (H) are not resolved within the predetermined time from when the energy saving key 41 is operated, the control unit 30 proceeds to step S901 and waits for the transition demand from the energy saving key 41.

Thus, if paper jam on the paper transportation path and paper out of the paper feed unit, as well as other error states are resolved within the predetermined time from when the energy saving key 41 is operated, the MFP 1 transitions to the energy saving mode without waiting for the energy saving key 41 to be further operated. Therefore, the operation of the energy saving key 41 by the user can be omitted.

The determination patterns 1 to 3 for whether the transition to the energy saving mode is possible can be set with various variants.

FIG. 10 is an explanatory view illustrating another example of the determination pattern for determining whether the transition to the energy saving mode is possible.

In a determination pattern 4 illustrated in FIG. 10, the transition to the energy saving mode is possible in the device state (A) for all of the conditions 1 to 3.

The device states (I) to (S) are in the operation of the device or in the execution of a process that cannot be failed, and the transition to the energy saving mode is not possible for all of the conditions 1 to 3.

The device states (B) to (F) are error states in which the return can be made by the user operation. Therefore, when the energy saving key 41 is pushed, although the user who operated the energy saving key 41 is at a position of being able to resolve the error state of the device states (B) to (F), an assumption is made that the user has not confirmed the error state. Thus, according to the determination pattern 4, in the condition 1 having the energy saving key 41 as the demanding source of the transition demand, the transition to the energy saving mode is set to be not possible to notify the user who operated the energy saving key 41 that the device state is any one of (B) to (F) if the device state is the device state (B) to (F).

The device states (G) and (H) are error states that require replacement of a device such as the developing unit, the fixing unit, the toner cartridge and the like, and the error state cannot be immediately resolved even if the user is positioned close to the MFP, if ordering of components takes time.

Therefore, in the condition 1 of the determination pattern 4, the transition to the energy saving mode is set to be possible if the device state is the device states (G) and (H).

If the transition demand from the sleep timer 42 as the demanding source is made, the user is assumed to be positioned at a position distant from the MFP 1. Therefore, according to the condition 2 of the determination pattern 4, the transition to the energy saving mode is set to be not possible to notify the user that the device state is any one of (B) to (H) if the device state is the device states (B) to (H).

When the transition demand from the time specifying unit 43 as the demanding source is made, the normal mode is continued for a long time if the user is not in a state of being able to immediately resolve the device states (B) to (H) and if the mode does not transition to the energy saving mode. In such a case, the energy saving effect is enhanced by transition to the energy saving mode even in the device states (B) to (H).

Therefore, according to the condition 3 of the determination pattern 4, the transition to the energy saving mode is possible even for the device states (B) to (H).

The transmission/reception unit 44 that transmits and receives data through the network may be arranged as a demanding source of the transition demand from the normal mode to the energy saving mode.

For example, the mode transition accepting unit 31 may accept the energy saving mode transition demand transmitted from the computer terminals 3, 4 through the LAN interface 21, and the transition determination unit 33 may determine whether the mode transition is possible.

In this case, a determination pattern in which a condition 4 is added to any one of the determination patterns 1 to 4 may be stored in the storage unit 52, the condition 4 having the determination on whether the transition is possible set for each device state when the transmission/reception unit 44 is assumed as the demanding source of the transition demand.

The determination patterns for mode transition described above can be applied to the MFP 1 including a plurality of different energy saving modes.

For example, the MFP 1 may have a first energy saving mode of turning OFF a backlight or an LED of a liquid crystal display arranged in the display unit 18, and a second energy saving mode of turning OFF the backlight or the LED of the liquid crystal display arranged in the display unit 18, and causing the scanner 19 and the printer 20 to be in the sleep mode. The second energy saving mode is a mode having a higher energy saving effect than the first energy saving mode.

The transition determination unit 33 may replace the normal mode in the determination pattern for the mode transition described above with the first energy saving mode and the energy saving mode with the second energy saving mode, and make the determination for mode transition corresponding to the transition demand from each demanding source.

The determination pattern in this case is not limited to the determination patterns described above, and a determination pattern to determine whether the transition from the first energy saving mode to the second energy saving mode is possible can be appropriately set. In addition to the energy saving mode transition determining process S410 of determining whether the transition from the normal mode to the first energy saving mode is possible, the transition determination unit 33 can carry out a second energy saving mode transition determining process of determining whether the transition from the first energy saving mode to the second energy saving mode is possible.

Furthermore, the MFP 1 may have three or more energy saving modes, and may have, for example, a third energy saving mode of turning OFF the backlight or the LED of the liquid crystal display arranged in the display unit 18, and turning OFF the electric power supply of the printer 20 as well as the electric power supply of the peripheral device; a fourth energy saving mode of activating only a simple network response process such as ping (Packet Internet Groper), ARP (Address Resolution Protocol), and the like; and a fifth energy saving mode of activating only the reception process of the facsimile.

In this case, the MFP 1 is assumed to transition through the first to fifth energy saving modes in a step-wise manner, and the transition determination unit 33 is configured to determine whether the transition among the modes is possible based on the respective determination patterns, for example.

The electronic device (MFP 1) of the present preferred embodiment preferably includes a mode transition accepting unit (mode transition accepting unit 31), a state confirmation unit (state confirmation unit 32), and a transition determination unit (transition determination unit 33). The mode transition accepting unit (mode transition accepting unit 31) accepts a transition demand from the first mode (normal mode) to the second mode (energy saving mode) from a plurality of demanding sources (energy saving key 41, sleep timer 42, time specifying unit 43, transmission/reception unit 44). The state confirmation unit (state confirmation unit 32) confirms the device state (device states (A) to (S)) of the electronic device (MFP 1). The transition determination unit (transition determination unit 33) determines whether or not the transition from the first mode (normal mode) to the second mode (energy saving mode) is possible based on the demanding source (energy saving key 41, sleep timer 42, time specifying unit 43, transmission/reception unit 44) of the transition demand accepted by the mode transition accepting unit (mode transition accepting unit 31) and the device state (device states (A) to (S)) confirmed by the state confirmation unit (state confirmation unit 32), and when the device state (device states (A) to (S)) is a predetermined device state (device states (B) to (H)), can make a determination that the transition is possible for some of the plurality of demanding sources (e.g., energy saving key 41, sleep timer 42, time specifying unit 43, transmission/reception unit 44) that issued the transition demand and not possible for others of the plurality of demanding sources (e.g., energy saving key 41, sleep timer 42, time specifying unit 43, transmission/reception unit 44) that issued the transition demand.

Accordingly, in the electronic device (MFP 1) of the present preferred embodiment, the determination as to whether the transition from the first mode (normal mode) to the second mode (energy saving mode) is possible can be flexibly made based on the demanding source (energy saving key 41, sleep timer 42, time specifying unit 43, transmission/reception unit 44) of the transition demand and the device state (device states (A) to (S)) confirmed by the state confirmation unit (state confirmation unit 32), so that the energy saving effect is greatly enhanced.

Other Preferred Embodiments

Preferred embodiments of the present invention have been described above, but the present invention is not limited to such preferred embodiments and various modifications can be made within a scope not deviating from the gist of the present invention. In particular, a plurality of preferred embodiments and variants described in the present specification may be arbitrarily combined as necessary.

Various preferred embodiments of the present invention and modifications thereof can be applied to an electronic device having an energy saving mode, and in particular, can be applied to a copying machine, a printer, a facsimile, and a multifunction peripheral having a multiple of such functions.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic device comprising a processor, wherein the processor operates to implement:
   a mode transition accepting unit that accepts, from a plurality of demanding sources, a transition demand to transition from a first mode to a second mode;
   a state confirmation unit that confirms a device state of the electronic device; and
   a transition determination unit that determines whether or not a transition from the first mode to the second mode is possible based on one of the plurality of the demanding sources that issued the transition demand accepted by the mode transition accepting unit, and the device state confirmed by the state confirmation unit; wherein
   in the first mode, the electronic device operates at a predetermined electric power;
   in the second mode, the electronic device operates at an electric power lower than the first mode;
   when the device state is a single, specific device state that is a predetermined device state, the transition determination unit makes a separate, independent determination, for each of the plurality of demanding sources, that the transition is possible for some of the plurality of the demanding sources that issued the transition demand and the transition is not possible for others of the plurality of the demanding sources that issued the transition demand; and
   the predetermined device state is an error state in which the state confirmation unit has not determined that the device state is a severe device error.

2. The electronic device according to claim 1, wherein the plurality of the demanding sources include:
   an input key that generates the transition demand by an operation of a user; and
   a timer that generates the transition demand when a predetermined device state is continued for a predetermined time;
   wherein when the device state is the predetermined device state, the transition determination unit determines that the transition from the first mode to the second mode is possible if the mode transition accepting unit accepts the transition demand from the input key as the demanding source, and determines that the transition from the first mode to the second mode is not possible if the mode transition accepting unit accepts the transition demand from the timer as the demanding source.

3. The electronic device according to claim 1, wherein the plurality of the demanding sources include:
   an input key that generates the transition demand by an operation of a user; and
   a timer that generates the transition demand when a predetermined device state is continued for a predetermined time;
   wherein when the device state is the predetermined device state, the transition determination unit determines that the transition from the first mode to the second mode is not possible if the mode transition accepting unit accepts the transition demand from the input key as the demanding source, and determines that the transition from the first mode to the second mode is possible if the mode transition accepting unit accepts the transition demand from the timer as the demanding source.

4. The electronic device according to claim 1, wherein the plurality of the demanding sources include:
   an input key that generates the transition demand by an operation of a user;
   a timer that generates the transition demand when a predetermined device state is continued for a predetermined time; and
   a time specifying unit that generates the transition demand at a set predetermined time.

5. The electronic device according to claim 4, wherein when the device state is the predetermined device state, the transition determination unit determines that the transition from the first mode to the second mode is not possible if the mode transition accepting unit accepts the transition demand from the input key or the timer as the demanding source, and determines that the transition from the first mode to the second mode is possible if the mode transition accepting unit accepts the transition demand from the time specifying unit as the demanding source.

6. The electronic device according to claim 5, wherein when the device state is the predetermined device state, the transition determination unit determines that the transition from the first mode to the second mode is not possible if the mode transition accepting unit accepts the transition demand from the input key as the demanding source, and thereafter, determines that the transition from the first mode to the second mode is possible when the predetermined device state is resolved within a predetermined time.

7. The electronic device according to claim 4, wherein when the device state is the predetermined device state, the transition determination unit determines that the transition from the first mode to the second mode is not possible if the mode transition accepting unit accepts the transition demand from the timer as the demanding source, and is determines that the transition from the first mode to the second mode is possible if the mode transition accepting unit accepts the transition demand from the input key or the time specifying unit as the demanding source.

8. The electronic device according to claim 4, wherein when the device state is the predetermined device state, the transition determination unit determines that the transition from the first mode to the second mode is not possible if the mode transition accepting unit accepts the transition demand from the input key as the demanding source, and determines that the transition from the first mode to the second mode is possible if the mode transition accepting unit accepts the transition demand from the timer or the time specifying unit as the demanding source.

9. The electronic device according to claim 1, wherein
   the predetermined device state includes a first device state and a second device state; and
   the transition determination unit determines, with respect to the transition demand from a same demanding source, that the transition from the first mode to the second mode is not possible for the first device state, and determines that the transition from the first mode to the second mode is possible for the second device state.

10. The electronic device according to claim 1, further comprising: a transmission/reception unit that transmits and receives data through a network; wherein the mode transition accepting unit accepts the transition demand received by the transmission/reception unit.

* * * * *